United States Patent
Hawighorst et al.

(10) Patent No.: US 9,284,132 B2
(45) Date of Patent: Mar. 15, 2016

(54) DEVICE FOR TURNING OVER AND CONVEYING AN OBJECT

(71) Applicant: Windmöller & Hölscher KG, Lengerich (DE)

(72) Inventors: Thomas Hawighorst, Hasbergen (DE); Alexander Titz, Bielefeld (DE); Rüdiger Duwendag, Lengerich (DE); Guido Tillmann, Ochtrup (DE)

(73) Assignee: WINDMOLLER & HOLSCHER KG (DE)

( * ) Notice: Subject to any disclaimer, the term of this patent is extended or adjusted under 35 U.S.C. 154(b) by 75 days.

(21) Appl. No.: 14/172,568

(22) Filed: Feb. 4, 2014

(65) Prior Publication Data

US 2014/0219766 A1    Aug. 7, 2014

(30) Foreign Application Priority Data

Feb. 5, 2013   (DE) .......................... 10 2013 101 149

(51) Int. Cl.
*B41F 1/00*     (2006.01)
*B41F 1/52*     (2006.01)
*B65H 31/20*    (2006.01)
(Continued)

(52) U.S. Cl.
CPC ................ *B65G 47/252* (2013.01); *B41F 1/52* (2013.01); *B65H 29/00* (2013.01); *B65H 29/20* (2013.01); *B65H 31/20* (2013.01); *B65G 2207/14* (2013.01); *B65H 2301/33214* (2013.01)

(58) Field of Classification Search
CPC .. B65G 47/252; B65G 2207/14; B65G 29/00; B65G 47/24; B65G 2203/042; B65G 47/244; B65G 15/14; B65G 2201/022; B65G 2249/02; B65G 47/31; B65G 49/061; B65G 49/064; B65G 49/067; B65H 2301/33214; B65H 15/02; B65H 15/00; B65H 2301/33212; B65H 2301/33224; B65H 2301/42112; B65H 2404/2691; B65H 29/00; B65H 29/20
USPC ............. 198/379, 403, 404, 408, 621.1, 624; 271/186; 414/405, 419, 759, 765, 766, 414/767, 771, 773
See application file for complete search history.

(56) References Cited

U.S. PATENT DOCUMENTS 2,772,766 A * 12/1956 Kellam .......................... 198/379
2,865,516 A    12/1958 Hedderich
(Continued)

FOREIGN PATENT DOCUMENTS

DE    19931145 A1   1/2001
DE    20219892 U1   4/2003
(Continued)

*Primary Examiner* — Gregory Adams
(74) *Attorney, Agent, or Firm* — Cantor Colburn LLP (57) ABSTRACT

A device for turning over an object, particularly a package of stacked sacks, having a holder device for receiving, turning over, and releasing the object, the holder device including two transport elements for conveying the object, and including at least one transport drive for the purpose of driving the transport elements, and having a rotary device for rotating the transport elements about a stationary axis of rotation, the rotary device including a rotatable frame to fasten the transport elements on both sides thereof, wherein the transport elements are fastened to the frame in a manner allowing movement, and wherein the transport drive is fastened in a torque-proof manner to the frame.

26 Claims, 4 Drawing Sheets

(51) Int. Cl.
  *B65H 29/00* (2006.01)
  *B65H 29/20* (2006.01)
  *B65G 47/252* (2006.01)

(56) References Cited

U.S. PATENT DOCUMENTS

| | | | |
|---|---|---|---|
| 2,984,364 A | | 5/1961 | Lamb |
| 3,071,257 A | * | 1/1963 | Jones et al. .................... 414/767 |
| 3,071,258 A | * | 1/1963 | Seigh et al. .................... 414/766 |
| 3,184,079 A | | 5/1965 | Buccicone |
| 3,547,279 A | * | 12/1970 | Radomski ...................... 414/765 |
| 3,595,369 A | * | 7/1971 | Boulay et al. ................. 198/434 |
| 3,710,955 A | | 1/1973 | Redman et al. |
| 4,013,177 A | * | 3/1977 | Kinnicutt et al. ............. 414/767 |
| 4,354,788 A | * | 10/1982 | Giusti ........................ 414/791.3 |
| 4,360,098 A | * | 11/1982 | Nordstrom ................. 198/418.1 |
| 4,452,561 A | * | 6/1984 | Forte ............................. 414/767 |
| 4,606,387 A | * | 8/1986 | Weislogel et al. ............. 144/356 |
| 4,798,278 A | * | 1/1989 | Cornacchia ................... 198/399 |
| 5,600,362 A | * | 2/1997 | Morgavi et al. ............... 347/218 |
| 5,823,317 A | * | 10/1998 | Bankuty et al. ............... 198/395 |
| 6,142,287 A | * | 11/2000 | Biffert et al. .................. 198/404 |
| 7,114,436 B1 | * | 10/2006 | Mueller ........................ 100/347 |
| 7,492,118 B2 | * | 2/2009 | Burgstahler et al. .......... 318/721 |
| 2011/0070059 A1 | * | 3/2011 | Savoia et al. .................. 414/758 |
| 2011/0297507 A1 | * | 12/2011 | Pini ............................... 198/379 |
| 2012/0037475 A1 | * | 2/2012 | Baccini et al. ................ 198/379 |

FOREIGN PATENT DOCUMENTS

| | | |
|---|---|---|
| EP | 1971540 B1 | 9/2009 |
| GB | 1305270 | 1/1973 |
| WO | WO 2010094346 A1 * | 8/2010 |

* cited by examiner

DEVICE FOR TURNING OVER AND CONVEYING AN OBJECT

TECHNICAL FIELD

The invention relates to a device for turning over an object, particularly a package of stacked sacks.

BACKGROUND

Devices for turning over objects are used in the transport and palletting of packages of stacked sacks. In this case, it sometimes happens that the sacks are not lying flat on top of each other, and the packages therefore sink in the middle. This can particularly occur if the sacks have folded bottoms or valves on their ends. In order to nonetheless obtain the flattest possible surface of such packages during palletting, it is therefore sometimes necessary to turn over the packages.

A device for turning over an object is known from DE 199 31 145 A1, designed with a holder device for the purpose of receiving, turning over, and releasing the object, and a rotary device for the purpose of turning over the holder device. The holder device in this case has two transport elements which can grip the object, wherein the transport elements can be turned over by means of the rotary device. The transport elements in this case can drive a stationary transport drive, and are able to transport the object only when they are in the same plane as a feed device and a conveyance device. In order to grip and turn over the object, the transport elements are hoisted out of the transport plane, and only then are they turned. In this case, it has proven disadvantageous that the transport of the objects is delayed. In addition, the stationary transport device requires a complicated mounting in order to drive the transport elements, and to cushion the movement of the transport elements toward the transport drive. Furthermore, additional complicated components are required to obtain a detachable connection between the transport elements and the transport drive, generally by means of a friction-fit connection.

BRIEF SUMMARY

The problem addressed by the invention is therefore that of providing an improved device for turning over an object, particularly a package of stacked sacks, which overcomes the disadvantages named above. In particular, the problem addressed by the invention is that of creating a device for turning over an object, which enables faster transportation of the object, and has a simple construction.

The invention suggests a device for turning over an object, particularly a package of stacked sacks, having a holder device for the purpose of receiving, turning over, and releasing the object, said holder device comprising two transport elements for the purpose of conveying the object, and comprising at least one transport drive for the purpose of driving the transport elements, and having a rotary device for the purpose of rotating the transport elements about a stationary axis of rotation, said rotary device comprising a rotatable frame to fasten the transport elements on both sides thereof, wherein the transport elements are fastened to the frame in a manner allowing movement, and wherein the transport drive is fastened in a torque-proof manner to the frame.

The inventive concept in this case is that the transport drive can be able to move with the frame, and therefore with the transport elements, such that when the frame is turned, the transport elements can continue to be driven, and the object can be moved on in a transport direction. In this way, it is possible to ensure that the transport of the object is not interrupted during the turning process. As such, it is possible to increase the transport speed and to improve the performance of the device. Particularly in modern facilities with a continuous production, conveyance, and palletting of stacked sacks, it is a significant advantage to be able to ensure high capacity in order to meet ever-increasing standards and ensure profitable production speeds. Because the transport drive can be rotated together with the frame, the functional connection between the transport drive and the transport elements must remain unbroken. Therefore, the advantage results that the transport drive can be rigidly fastened to the frame, because there is no need for the movement of the transport elements to the transport drive to be cushioned. The functional connection between the transport drive and the transport elements can advantageously be preserved during the turning process and the transport of the object. For this reason, the functional connection can be produced in a simple manner using simple components such as toothed belts and rotary wheels and/or rollers.

The invention also proceeds from the thinking that the transport drive can have a dedicated drive device for each transport element. In this way, it is possible to achieve the advantage that both of the transport elements can be designed for the transport of the object, regardless of the rotary position. Because both transport elements can take part in the transportation of the object, it is possible to increase the transport speed, and at the same time, it is possible to reduce the drive power required for the transport. In addition, it is advantageous that the drive devices can have a smaller and lighter design.

The transport elements can advantageously be connected to each other by means of an adjustment mechanism, and/or can be able to move toward each other in a gripping direction in order to grip the object for the purpose of turning it. According to the invention, the adjustment mechanism can have a pneumatic cylinder, and the pneumatic cylinder particularly can have quick ventilation valves. Pneumatic drives advantageously enable high drive speeds, while at the same time it is possible to achieve an elastic and resilient drive behavior. The adjustment mechanism according to the invention is therefore particularly suited for arrangement on objects being moved, such that the adjustment mechanism can be fastened directly to the transport elements. In addition, it can be advantageous that objects of different sizes and heights can be reliably received by the adjustment mechanism according to the invention. The feed of pressurized air can advantageously be supplied through a flexible tube, which can be routed through the axis of rotation of the device and to the pneumatic cylinder, by way of example.

The invention can also be configured such that the rotary device has a damper in order to dampen the movement of the transport elements toward each other, and in that the damper is particularly fastened to the frame in a torque-proof manner. Particularly in modern devices with high transport and rotation speeds, the dampers can protect the object from the excessively strong impact with the transport elements. The dampers in this case can be moved together with the frame and therefore with the transport elements, such that in each rotary position of the transport elements, it is possible for the object to be reliably gripped while also being dampened from impacts.

According to the invention, the transport elements can be designed in the form of roller tracks. In addition, it can be contemplated that each transport element can have at least two transport rollers which can have a functional connection to each other by means of a connector belt, particularly a flat, toothed, or v-ribbed belt. Roller tracks can advantageously have a flexible design and be adapted to the spatial specifications and the size of the object. In addition, it is advantageous that such transport elements can be adapted to the weight of the object being transported. In this case, the rollers can be constructed of different materials such as steel or plastic, according to the weight of the object being transported. In addition, the receiving action and the transport capability of the roller tracks can be adjusted by means of different widths of the transport rollers. For the purpose of driving the transport rollers, which can each be connected to form pairs by means of a connector belt, the connection to the transport drive can advantageously only be produced on one of the transport rollers. If only one transport roller is set in motion, all other transport rollers automatically move with it, because the movement is transmitted via the connector belts. As an alternative, it can be contemplated that the transport rollers can be connected to the transport drive via a gearing which can have a flat belt and a drive wheel with a corresponding friction lining. As an alternative, the transport elements can be designed in the form of a hauling track having a conveyor belt and two deflector rollers. In this case, the transport drive can engage with one of the deflector rollers. As an alternative or in addition thereto, the transport drive can be arranged in one of the transport rollers and/or deflector rollers.

The transport elements can advantageously have fastener elements on both sides, clasping the transport rollers and serving to fasten the transport elements to the frame. As such, the transport elements can be designed as an integrated component together with the transport rollers. The attachment of the transport rollers on the frame can be simplified in this way, wherein the fastener elements can be mounted on the frame in a manner allowing sliding.

The invention further includes a configuration wherein the rotary drive can have a motor, and particularly a drum motor. In this case, the frame can have two rotary disks in order to clasp around the transport elements on both sides. The drum drive in this case can transmit the drive action of the motor to the frame via a flat, toothed, or v-ribbed belt. The drum drive can advantageously set into motion heavy objects with a high gear ratio and generate a high torque. As such, the device can provide improved rotation speed of the object and enable rapid conveyance of the object.

According to the invention, each rotary disk can have a guide rail which can work together with glide elements which can be arranged on the transport elements on both sides. The guide rails can advantageously serve the purpose of fastening the transport elements to the rotary disks, and also mounting the transport elements to the rotary disks on the other side in a manner allowing movement. Then, not only can the transport elements be rotated by means of the rotary disks, but they can also be moved toward and away from each other at the same time, in order to grip the object for turning and releasing it for further transport.

According to the invention, the drive device can have a drive wheel which can be driven by a drive motor, and a deflector wheel, in order to transmit the action of the drive motor to the transport element by means of a transmission wheel. The inventive concept in this case is that the drive device can be designed with a joint. As such, the motor can be rigidly fastened on the frame, and can drive the transport element, which is able to move on the frame, via the deflector wheel and the transmission wheel. In this way, it is advantageously possible to ensure that the object can be moved farther on in the transport direction during the gripping movement and during the rotation of the object. The speed of conveyance of the device according to the invention is significantly improved in this case.

The drive wheel in this case can be fastened in a torque-proof manner to the frame, wherein the transmission wheel can be fastened to the transport element and can move together with the transport element, and wherein the deflector wheel can be moved together, at least partially, with the transport element. The deflector wheel can advantageously be able to move freely, and can have a mechanical functional connection to only the drive wheel and the transmission wheel. The drive wheel, the deflector wheel, and the transmission wheel in this case form a type of scissor arrangement having two legs between the drive wheel and the deflector wheel and between the deflector wheel and the transmission wheel, with the vertex in the deflector wheel. The drive movement in this case is transmitted from the drive wheel to the deflector wheel and from the deflector wheel to the transmission wheel, wherein the transmission wheel can be moved together with the transport elements for the purpose of gripping the object, and wherein the drive movement can nonetheless be further transmitted to the transport elements. As a result, it is advantageously possible that the transport elements have a functional connection to the transport drive, and continue to convey the object in the transport direction, in each position on the guide rails.

In addition, it can be advantageous that the transmission wheel is a part of the transport element, particularly a transport roller. According to the invention, each transport roller can transmit the rotary movement to a neighboring transport roller by means of the connection elements. As such, the drive device can set in motion the respective roller track in order to transport the object. In this case, it is advantageous that a transport roller can serve as part of the transport drive. As such, it is possible to reduce the number of the gearing elements, particularly compared to a friction wheel drive, such that it is possible to simplify the connection between the transport drive and the corresponding transport element.

According to the present invention, the drive wheel can have a functional connection to the deflection wheel by means of a first drive belt and/or the deflector wheel can have a functional connection to the transmission wheel by means of a second drive belt, wherein the first and/or the second drive belts can particularly be designed in the form of a flat, toothed, or v-ribbed belt. The connection to the drive motor can therefore be produced and maintained in a simple manner, because the drive belts can lie permanently on the wheels. The action of the drive device can advantageously be transmitted to the transport rollers by the drive belts regardless of the position of the transport elements at the frame.

An abrasive ring can be advantageously included on the axis of rotation in order to energize the transport drive, particularly the drive motor.

According to one particular advantage of the invention, the rotary drive can drive the frame on both sides, wherein the rotary drive particularly has two gear elements which can rotate about a rotary shaft in order to drive both rotary disks. In contrast to a single-sided rotary drive, it is particularly advantageous that the rotary disks can be driven by only one rotary drive by means of the two gearing elements. In this case, the rotation speed of the frame can be increased while the rotary drive output remains constant. The rotary device in this case no longer requires any heavy connection elements in order to connect the rotary disks, and in order to transmit the rotation movement from the rotary disk on the input side to the second rotary disk which is opposite the rotary drive. The transport elements can therefore be fastened to the frame in a reliable manner, and can be mounted in the guide rails, wherein at the same time it is possible to ensure a high rotation speed of the holder device.

According to the invention, the rotary drive can have two transmission elements, particularly two flat, toothed, or v-ribbed belts, in order to transmit the action of the gear elements to the rotary disks. The transport elements also advantageously function such that the action of the rotary drive can be transmitted evenly to both rotary disks. In contrast to a single-sided drive, the device can have a more stable, and nonetheless lighter design, wherein the energy consumption for turning over the object can be reduced at an increasing rotary speed.

BRIEF DESCRIPTION OF THE DRAWINGS

Additional advantages, features, and details of the invention are found in the following description, wherein multiple embodiments are described in detail with reference to the drawings. In the drawings.

DETAILED DESCRIPTION

Figure 1:
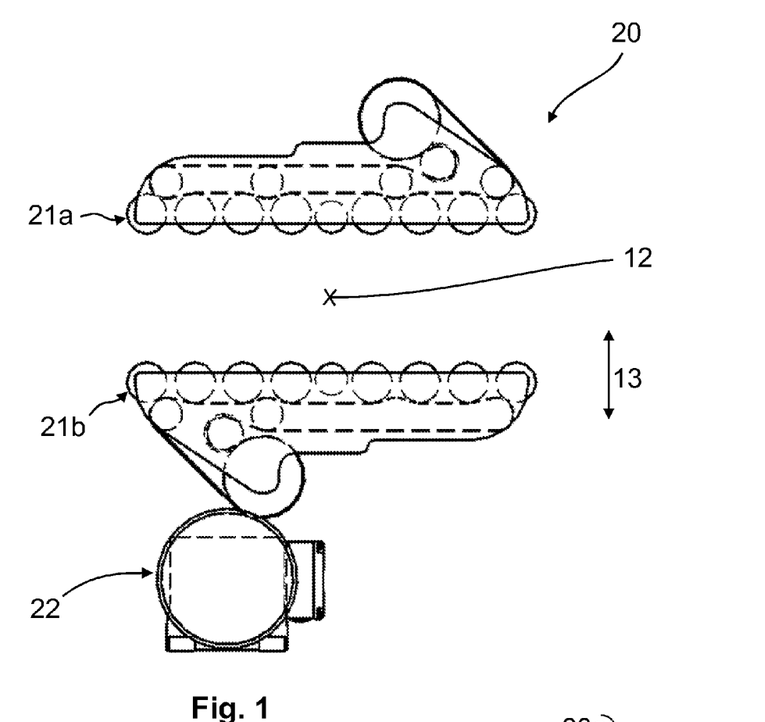
FIG. 1 shows a schematic illustration of a conventional device for turning over an object.
Figure 2:
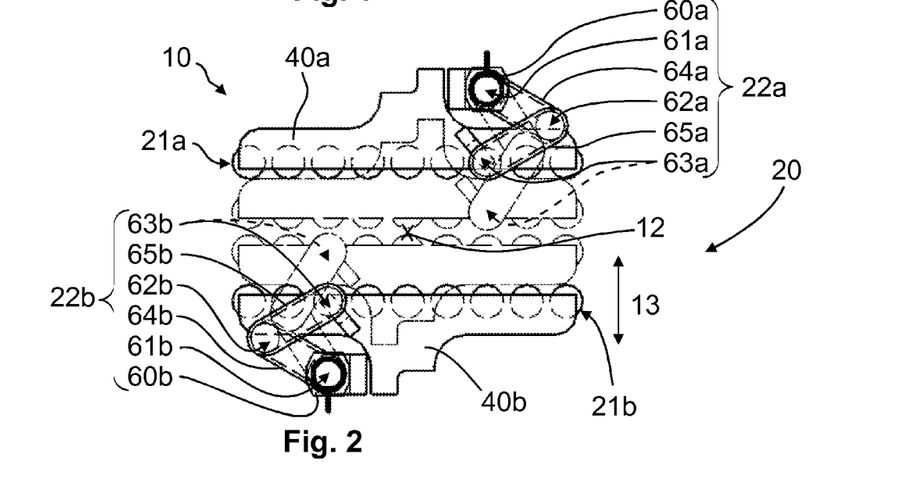
FIG. 2 shows a schematic illustration of a device according to the invention for turning over an object.

FIG. 1 shows a device for turning over an object, as is known in the prior art, and FIG. 2 shows the device 10 according to the invention, wherein details are given below of the devices and their differences. The conventional device, similarly to the device 10 according to the invention, has a holder device 20 for the purpose of receiving, turning over, and releasing an object, said holder device 20 having two height-adjustable 13 transport elements 21a, 21b for the purpose of conveying the object and one transport drive 22 for the purpose of driving the transport elements 21a, 21b, and has a rotary device 30 for the purpose of rotating the transport elements 21a, 21b about a stationary axis of rotation 12, which is described in greater detail in the context of FIGS. 7 and 8.

Figure 6:
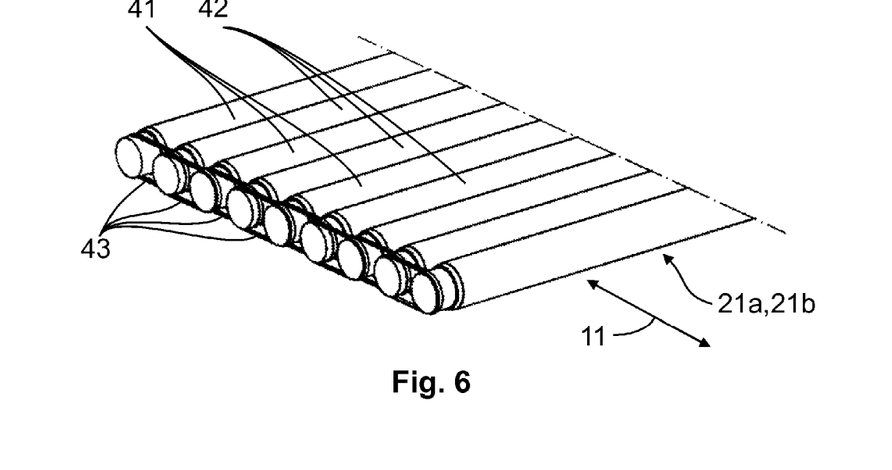
FIG. 6 shows a schematic illustration of a transport element according to the invention.
Figure 7:
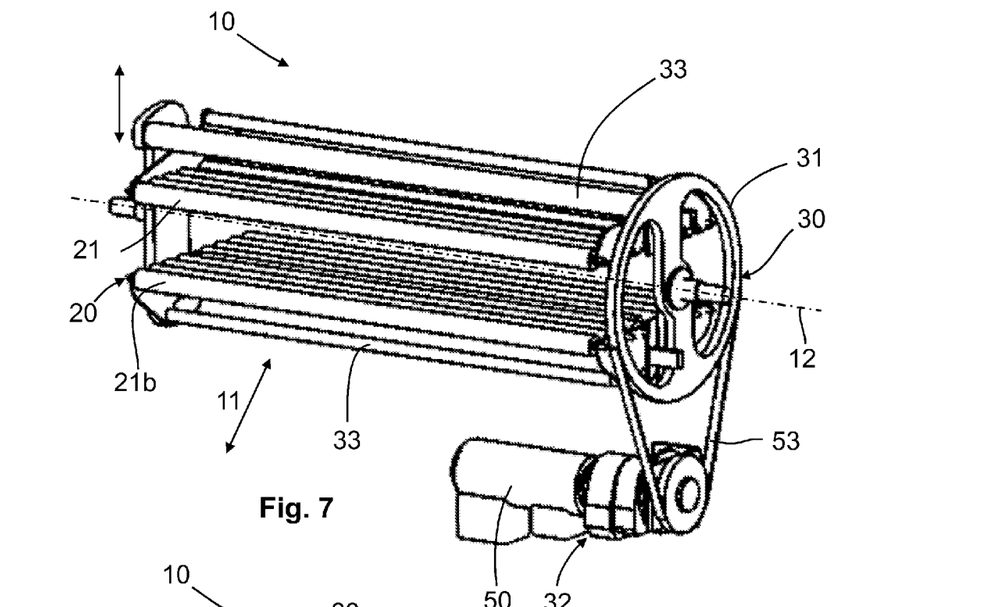
FIG. 7 shows a perspective illustration of the conventional device for turning over an object.
Figure 8:
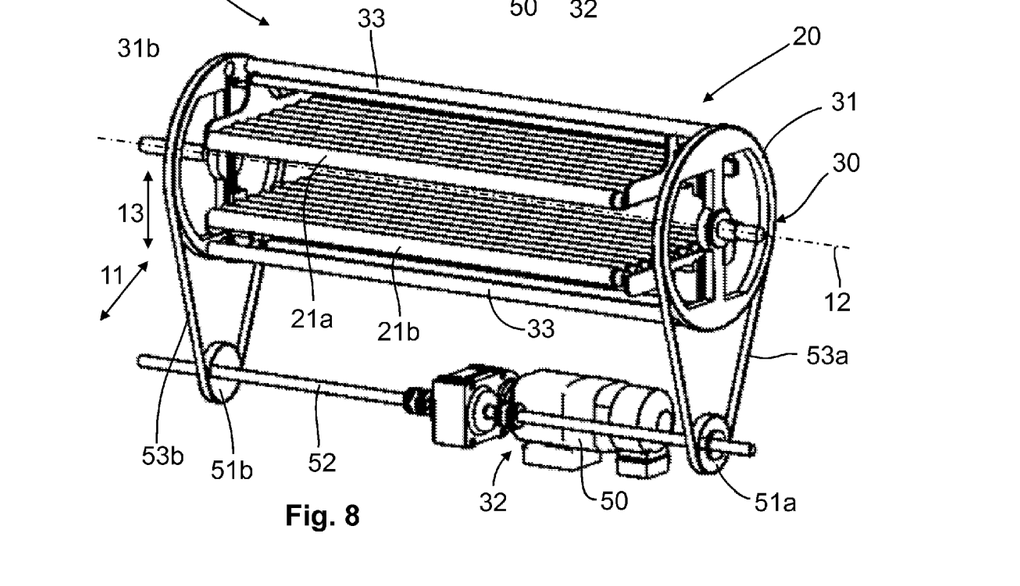
FIG. 8 shows a perspective illustration of the device according to the invention for turning over an object.

The invention relates to the novel transport drive 22, as shown in FIG. 2, wherein in contrast to the conventional transport device 22 in FIG. 1, said transport drive 22 can move with a frame 31 of the rotary device 30, as shown in FIGS. 7 and 8, and therefore with the transport elements 21a, 21b. The concept of the invention is that when the transport elements 21a, 21b are turned over, they can continue to be driven and the object can continue to be moved in a transport direction 11, which is shown in FIG. 6. The advantage of the invention is that the transport of the object is not interrupted, even during the turning movement of the transport elements 21a, 21b.

Figure 3:
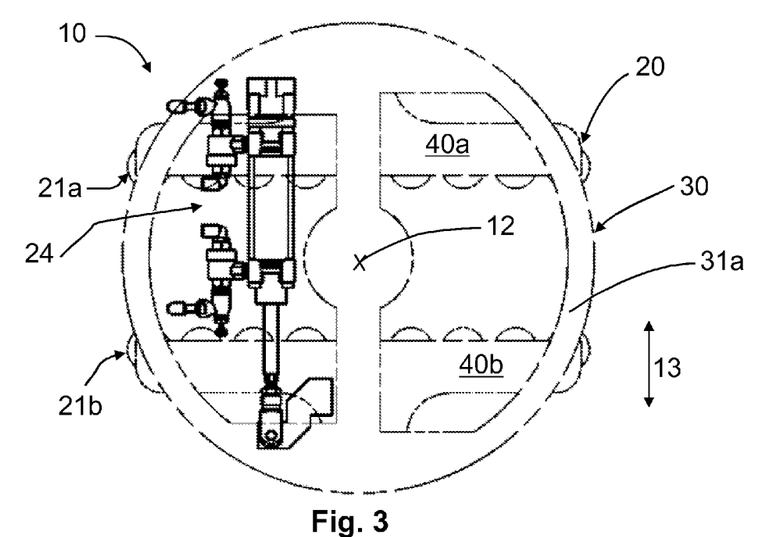
FIG. 3 shows a schematic illustration of an adjustment mechanism according to the invention.
Figure 4:
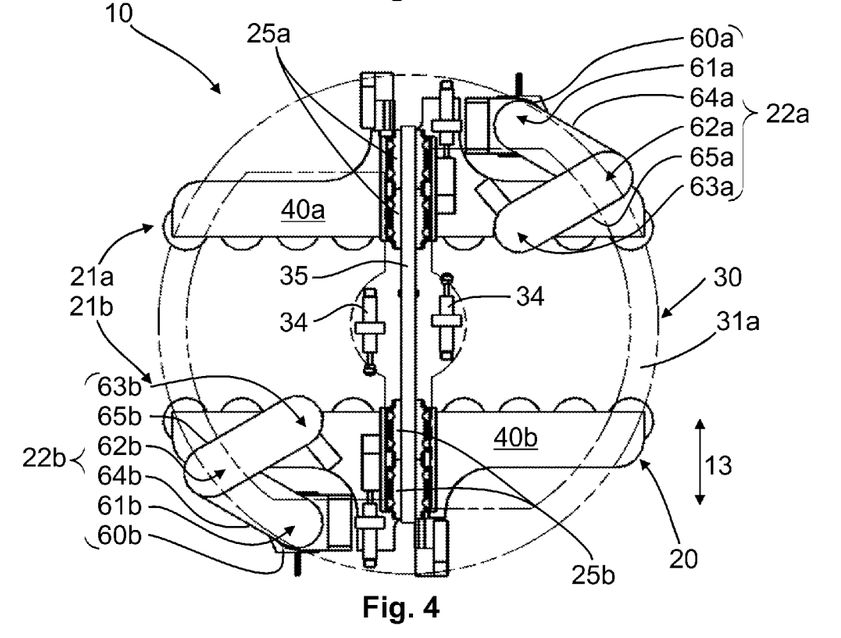
FIG. 4 shows a schematic illustration of a damper according to the invention.
Figure 5:
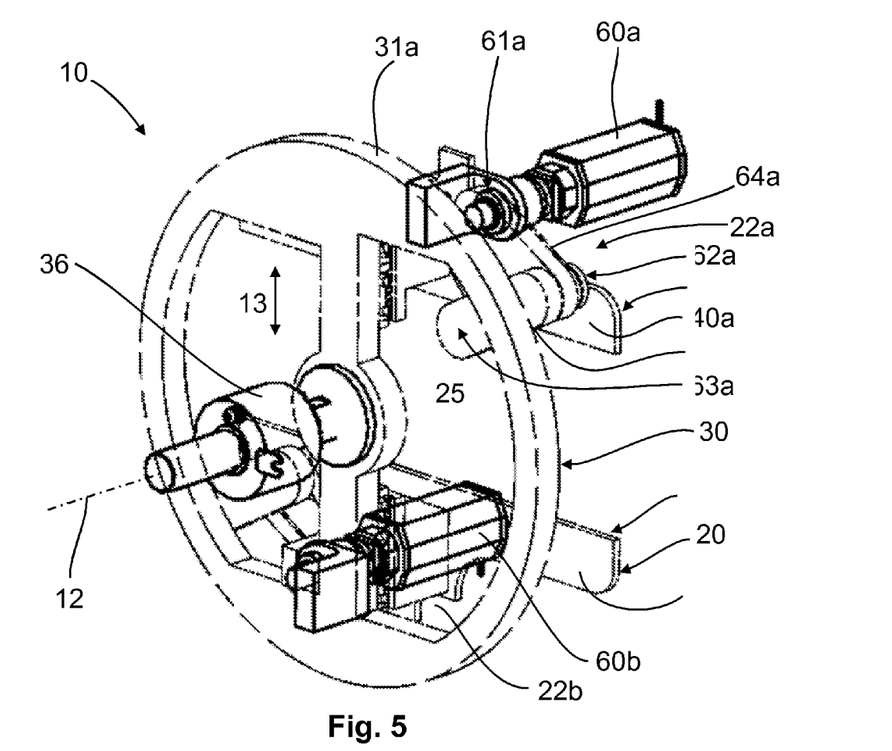
FIG. 5 shows a schematic illustration of an abrasive ring according to the invention.

The transport drive 22 according to the invention is rigidly fastened on the frame 31, as shown in FIGS. 4 and 5. In contrast, the transport drive 22 of the conventional device in FIG. 1 is arranged on a housing of the device, which is not illustrated, in a stationary manner. In the device in FIG. 1, only the transport elements 21a, 21b are moved toward each other in a vertical direction 13 in order to grip the object. In this case, the conventional transport drive 22 must at least partially cushion the movement of the transport elements 21a, 21b to the transport device 22 during the return movement of the transport elements 21a, 21b apart from each other, until the functional connection between the transport elements 21a, 21b and the transport drive 22 is established. In order to achieve this, the stationary transport drive 22 is normally mounted via spring on the housing of the device. In contrast to the prior art, the transport drive 22 according to the invention can be fixed to the rotary device 30 (see FIGS. 3 and 4), because the functional connection between the transport drive 22 according to the invention and the transport elements 21a, 21b is not broken even during the turning movement. The transmission of force by the conventional transport drive 22 to the transport elements 21a, 21b is realized by means of a drive wheel with a special friction insert and a corresponding flat belt on the side of the transport elements 21a, 21b, which set the transport elements 21a, 21b in motion by means of a wheel drive. In contrast, the functional connection between the transport drive 22 according to the invention and the transport elements 21a, 21b can be realized in a simple manner, and by means of both simple and fewer components—such as flat, toothed, or v-ribbed belts 64, 65—and can be maintained during the transporting and the turning movement of the object.

FIG. 2 shows one embodiment of the invention, wherein the transport drive 22 according to the invention can have a dedicated drive device 22a, 22b for each transport element 21a, 21b. According to this embodiment, the two drive devices 22a, 22b serves the purpose of allowing both of the transport elements 21a, 21b to transport the object regardless of their rotary position. In this way, it is possible to significantly increase the transport speed, and at the same time it is possible to reduce the drive power required by the drive devices 22a, 22b. For this reason, it is possible to use smaller and lighter drive devices 22a, 22b.

FIG. 3 shows an adjustment mechanism 24 which serves the purpose of connecting the transport elements 21a, 21b to each other and moving them towards each other in a vertical gripping direction 13, in order to grip the object for the turning. The adjustment mechanism 24 according to the invention is designed as a pneumatic cylinder 24. The pneumatic cylinder 24 in this case has quick ventilation valves in order to move the transport elements 21a, 21b quickly while nevertheless achieving an elastic and resilient gripping of the object. According to the invention, the adjustment mechanism 24 is directly fastened to the transport elements 21a, 21b. The feed of pressurized air can advantageously be supplied through a flexible tube, which can be routed through the stationary axis of rotation 12 of the device and to the adjustment mechanism 24, by way of example. Dampers 34 are shown in FIG. 4 which serve the purpose of damping the movement of the transport elements 21a, 21b toward each other, and protecting the object from mechanical forces resulting from the transport elements 21a, 21b during gripping 21a, 21b. In the illustrated embodiment, the dampers 34 are fastened in a torque-proof manner to the rotary device 30, and during the turning process, the dampers 34 are moved together with the transport elements 21a, 21b. FIG. 5 shows a further advantageous embodiment of the invention having an abrasive ring 36 which is arranged on the axis of rotation 12 in order to supply energy to the drive motors 60a, 60b of the rotatable drive devices 22a, 22b.

FIG. 6 shows one embodiment of the transport elements 21a, 21b according to the invention, which are designed in the form of roller tracks. The roller track includes multiple transport rollers 41, 42, wherein the number of transport rollers 41, 42, as well as the size and weight thereof, can be adapted to the dimensions of the object. According to the invention, the transport rollers 41, 42 can be constructed from different materials such as steel or plastic, according to the weight and size of the object being transported. Every pair of two neighboring transport rollers 41, 42 is connected together, particularly in a torque-proof manner, to a connector belt 43, in order to transmit the rotary movement from one transport roller 41, 42 to the other. The connector belt 43 can be designed as a flat, toothed, or v-ribbed belt, by way of example. According to the invention, only one of the transport rollers 41, 42 is set into motion (see FIGS. 2 and 4); the rotary movement is transmitted to all the other transport rollers 41, 42 via the connector belt 43.

The transport elements 21a, 21b are, as shown in FIGS. 2 to 5, arranged by both ends in a rotatable manner on fastener elements 40a, 40b which clasp around the transport rollers 41, 42 and also serve the purpose of fastening the transport elements 21a, 21b to the rotary device 30. FIG. 4 shows that the fastener elements 40a, 40b in this case are mounted on the frame 31 of the rotary device 30, along a guide rail 35, in a manner allowing sliding. The frame 31 of the rotary device 30 has two rotary disks 31a, 31b which are shown in more detail in FIG. 8. Each of the rotary disks 31a, 31b in this case is designed with a guide rail 35 for the purpose of mounting the transport elements 21a, 21b by both ends in a manner allowing sliding. Each guide rail 35 works together, according to the invention, with glide elements (25a, 25b) which are arranged on the fastener elements 40a, 40b of the transport elements (21a, 21b). According to the invention, the transport elements 21a, 21b are not only rotated by means of the rotary disks 31a, 31b, but also can be moved toward and away from each other at the same time along arrow 13, in order to grip the object for the purpose of turning and releasing it for further transport.

The drive devices 22a, 22b according to the invention each have a drive wheel 61a, 61b which is driven by its own drive motor 60a, 60b, and a deflector wheel 62a, 62b, in order to transmit the action of the drive motor 60a, 60b to the corresponding transport element 21a, 21b via a transmission wheel 63a, 63b. According to the invention, the drive devices 22a, 22b have a jointed design, with a joint in the deflector wheel 62a, 62b. The drive motor 60a, 60b is rigidly fastened to the frame 31, wherein the drive force is transmitted by the articulated drive devices 22a, 22b to transport elements 21a, 21b which are arranged on the frame 31 in a manner allowing movement. In this way, a configuration is achieved wherein the object can be moved farther on in the transport direction 11 during the gripping movement and during the rotation of the object.

The drive wheel 61a, 61b in this case is fastened in a torque-proof manner to the corresponding rotary disk 31a, 31b. In contrast, the transmission wheel 63a, 63b is fastened on the transport element 21a, 21b and can move with the transport element 21a, 21b. In this case, the deflector wheel 62a, 62b is at least partially carried along with the transport element 21a, 21b. According to the invention, the deflector wheel 62a, 62b is able to move freely, and has a mechanical functional connection to only the drive wheel 61a, 61b and the transmission wheel 63a, 63b. The drive wheel 61a, 61b, the deflector wheel 62a, 62b, and the transmission wheel 63a, 63b in this case form a type of scissor arrangement having two legs between the drive wheel 61a, 61b and the deflector wheel 62a, 62b and between the deflector wheel 62a, 62b and the transmission wheel 63a, 63b, with the vertex in the deflector wheel 62a, 62b. The drive devices 22a, 22b are opened and/or closed toward and away from each other upon the movement of the transport elements 21a, 21b in the joint on the deflector wheel 62a, 62b. The drive force in this case is nevertheless reliably transmitted from the drive wheel 61a, 61b to the deflector wheel 62a, 62b and from the deflector wheel 62a, 62b to the transmission wheel 63a, 63b. As a result, a configuration is achieved wherein the transport elements 21a, 21b have a functional connection to the corresponding transport drive 60a, 60b in each position on the guide rails 35, and the transport rollers 41, 42 transport the object.

According to the invention, the transmission wheel 63a, 63b can engage directly with a transport roller 41, 42. These transport rollers 41, 42 then transmit the rotary movement to a neighboring transport roller 41, 42 by means of the connection element 43, and thereby set the respective roller track in motion. As such, one of the transport rollers 41, 42 serves as a part of the drive device 22a, 22b. In contrast to the conventional device in FIG. 1, the device 10 according to the invention requires fewer components and gearing elements, which can be seen in FIGS. 1 and 2.

Each drive wheel 61a, 61b according to the invention, as shown in FIGS. 2, 4, and 5, is connected to the deflector wheel 62a, 62b by means of a first drive belt 64a, 64b, and the deflector wheel 62a, 62b is connected to the transmission wheel 63a, 63b by means of a second drive belt 65a, 65b. The first and the second drive belts 64, 65 can be designed in the form of a flat, toothed, or v-ribbed belt, by way of example. The drive belts 64, 65 stay in their position flush with the wheels 62, 63, 64 permanently, and maintain the mechanical functional connection from the drive motor 60a, 60b to the transport elements 21a, 21b during the entire process, independently of the position of the transport elements 21a, 21b on the frame 31. Because the transport elements 21a, 21b are also driven during the turning motion, it is possible to significantly increase the transport speed of the object and to improve the performance of the device. For this purpose, the drive devices 22a, 22b are rotated together with the transport elements 21a, 21b during the turning movement.

FIGS. 7 and 8 show a conventional rotary device 32 and a rotary device 30 according to the invention. Both devices have a rotary drive 32 with the motor 50 which is designed as a drum motor. The conventional rotary drive 32 in FIG. 7 only acts on one side of the holder device 20, and the rotary device 30 in FIG. 7 only has one rotary disk 31 and one transmission element 53 for the purpose of transmitting the drive force of the motor 50 to only one side of the holder device 20. In contrast, the rotary device 30 according to the invention is designed with a rotatable frame 31 which has two rotary disks 31a, 31b to clasp the holder device 20 from two sides. The special advantage of the invention is that the rotary drive 32 according to the invention drives the frame 31 on both sides thereof. The rotary drive 32 according to the invention, which is shown in FIG. 8, engages with the frame 31 via two rotary disks 31a, 31b which clasp the transport elements 21a, 21b on both sides. For this purpose, the rotary drive 32 has two gearing elements 51a, 51b which are mounted about a rotary shaft 52 in a manner allowing rotation, said rotary shaft [52] extending parallel to the axis of rotation 12 of the transport elements 21a, 21b. The rotary shaft 52 is driven by the motor 50 and transmits the rotary movement to the two gearing elements 51a, 51b. The gearing elements 51a, 51b in turn are connected to the two rotary disks 31a, 31b and drive them via two transport elements 53a, 53b, for example in the form of flat, toothed, or v-ribbed belts about the axis of rotation 12.

Compared to the conventional, one-sided rotary drive 32 in FIG. 7, it is particularly advantageous that both rotary disks 31a, 31b are actively driven by only the rotary drive 32 in order to transmit the rotary movement evenly to the holder device 20. As such, the rotation of the transport elements 21a, 21b can be stabilized at the same output. In this case, the transport elements 21a, 21b can be held more reliably on the rotary disks 31a, 31b at higher rotation speed than in the device in FIG. 7. The conventional rotary device in FIG. 7 requires heavy connection elements 33 in order to transmit the rotation movement from only one side to the side of the transport elements 21a, 21b which faces away from the rotary drive. In addition, the danger exists in the conventional device in FIG. 7 that the transport elements 21a, 21b can deflect out of the connection points with the frame 30, which are opposite the drive, due to their inertia. According to the invention, the device 10 in FIG. 8, in contrast, does not need any torsion-proof connection elements 33, because the rotation movement is transmitted to the transport elements 21a, 21b from two sides. The transport elements 21a, 21b are therefore reliably held on the frame 31 during the rotational movement, wherein at the same time it is possible to ensure a high rotation speed of the holder device 20. In addition, it is advantageous that, in contrast to a one-sided rotary drive 32, the rotary device 30 according to the invention can have a more stable, but nevertheless lighter, design.

The features of the embodiment of the invention described in the context of FIGS. 2 to 6 and 8 can be combined with each other, and it can be contemplated that the device 10 in FIG. 8 can be designed with a transport drive 22, as shown in FIGS. 2 to 5, and vice-versa. The transport drive 22 can have one dedicated drive device 22a, 22b for each transport element 21a, 21b. In addition, it can be contemplated that a conveyor belt can be used in place of a roller track as in FIG. 6. As an alternative to the embodiment in FIG. 8, the rotary drive 32 can have a dedicated drive device for each rotary disk 31a, 31b.

The invention claimed is:

1. A device for turning over a package of stacked sacks, comprising:
    a holder device for the purpose of receiving, turning over, and releasing the package, said holder device comprising two transport elements for the purpose of conveying the package, and comprising at least one transport drive for the purpose of driving the transport elements, and having a rotary device for the purpose of rotating the transport elements about a stationary axis of rotation, said rotary device comprising a rotatable frame to fasten the transport elements on both sides thereof,
    wherein the transport elements are fastened to the frame in a manner allowing movement, and wherein the transport drive is rigidly fastened to the frame, and
    wherein the rotary device has a damper in order to dampen the movement of the transport elements toward each other, and wherein the damper is rigidly fastened to the frame.

2. A device according to claim 1, wherein the transport drive has one drive device for each transport element.

3. A device according to claim 1, wherein the transport elements are connected to each other by means of an adjustment mechanism, and/or are able to move toward each other in a gripping direction in order to grip the package for the purpose of turning it.

4. A device according to claim 3, wherein the adjustment mechanism has a pneumatic cylinder, and the pneumatic cylinder has quick ventilation valves.

5. A device according to claim 1, wherein the transport elements are designed in the form of a roller track, wherein the transport element has at least two transport rollers which are functionally connected to each other by means of a connector belt comprising a flat, toothed, or v-ribbed belt.

6. A device according to claim 1, wherein the transport elements have fastener elements on both sides, and these clasp around the transport rollers and serve to fasten the transport elements to the frame.

7. A device according to claim 1, wherein the rotary device has a rotary drive which comprises a motor.

8. A device according to claim 7, wherein the rotary drive drives the frame on both sides, wherein the rotary drive has two gear elements which can rotate about a rotary shaft in order to drive both rotary disks.

9. A device according to claim 7, wherein the rotary drive has two transmission elements, comprising two flat, toothed, or v-ribbed belts, in order to transmit the action of the gear elements to the rotary disks.

10. A device according to claim 1, wherein the frame has two rotary disks in order to clasp around the transport elements on both sides.

11. A device according to claim 10, wherein each rotary disk has a guide rail which works together with glide elements which are arranged on the transport elements on both sides thereof.

12. A device according to claim 1, wherein an abrasive ring is included on the axis of rotation, in order to supply energy to the transport drive.

13. A device for turning over a package of stacked sacks comprising
    a holder device for the purpose of receiving, turning over, and releasing the package, said holder device comprising two transport elements for the purpose of conveying the package, and comprising at least one transport drive for the purpose of driving the transport elements, and having a rotary device for the purpose of rotating the transport elements about a stationary axis of rotation, said rotary device comprising a rotatable frame to fasten the transport elements on both sides thereof,
    wherein the transport elements are fastened to the frame in a manner allowing movement, and wherein the transport drive is rigidly fastened to the frame, and wherein the drive device has a drive wheel which can be driven by a drive motor, and a deflector wheel, in order to transmit the action of the drive motor to the transport element by means of a transmission wheel.

14. A device according to claim 13, wherein the drive device is designed with a joint.

15. A device according to claim 13, wherein the drive wheel is rigidly fastened to the frame, wherein the transmission wheel is fastened to the transport element and is able to move with the transport element, and wherein the deflector wheel can move at least partially together with the transport element.

16. A device according to claim 13, wherein the transmission wheel is a part of the transport element.

17. A device according to claim 13, wherein the drive wheel has a functional connection to the deflector wheel by means of a first drive belt, and/or the deflector wheel has a functional connection to the transmission wheel by means of a second drive belt, wherein the first and/or the second drive belts are designed in the form of a flat, toothed, or v-ribbed belt.

18. A device according to claim 13, wherein an abrasive ring is included on the axis of rotation, in order to supply energy to the transport drive.

19. A device for turning over a package of stacked sacks, comprising:

a holder device for the purpose of receiving, turning over, and releasing the package, said holder device comprising two transport elements for the purpose of conveying the package, and comprising at least one transport drive for the purpose of driving the transport elements, and having a rotary device for the purpose of rotating the transport elements about a stationary axis of rotation, said rotary device comprising a rotatable frame to fasten the transport elements on both sides thereof, wherein the transport elements are fastened to the frame in a manner allowing movement, and wherein the transport drive is rigidly fastened to the frame, wherein an abrasive ring is included on the axis of rotation, in order to supply energy to the transport drive.

20. A device according to claim 19, wherein the transport drive has one drive device for each transport element.

21. A device according to claim 19, wherein the transport elements are connected to each other by means of an adjustment mechanism, and/or are able to move toward each other in a gripping direction in order to grip the package for the purpose of turning it.

22. A device according to claim 21, wherein the adjustment mechanism has a pneumatic cylinder, and the pneumatic cylinder has quick ventilation valves.

23. A device according to claim 19, wherein the transport elements are designed in the form of a roller track, wherein the transport element has at least two transport rollers which are functionally connected to each other by means of a connector belt comprising a flat, toothed, or v-ribbed belt.

24. A device according to claim 19, wherein the transport elements have fastener elements on both sides, and these clasp around the transport rollers and serve to fasten the transport elements to the frame.

25. A device according to claim 19, wherein the rotary device has a rotary drive which comprises a motor.

26. A device according to claim 19, wherein the frame has two rotary disks in order to clasp around the transport elements on both sides.

* * * * *